D. K. THOMAS.
SAFE AND VAULT.
APPLICATION FILED FEB. 17, 1912.
1,062,056.
Patented May 20, 1913.
7 SHEETS—SHEET 1.
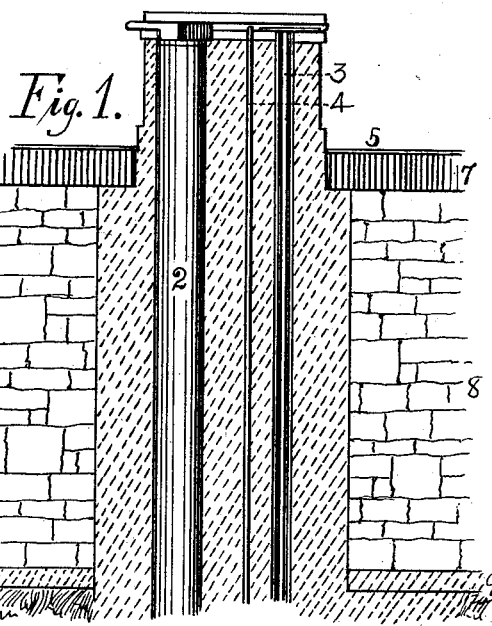
Fig. 1.
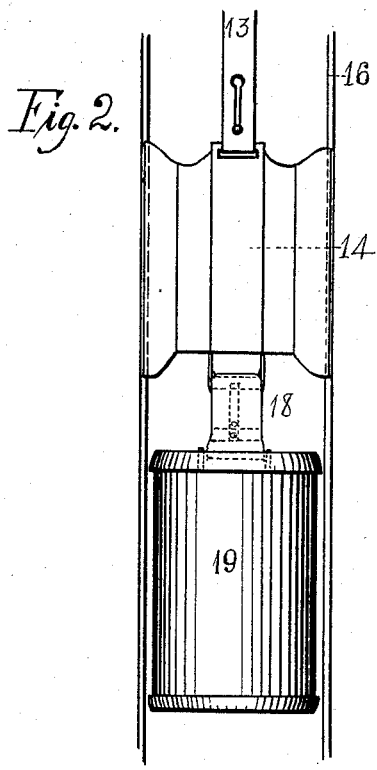
Fig. 2.
Fig. 3.
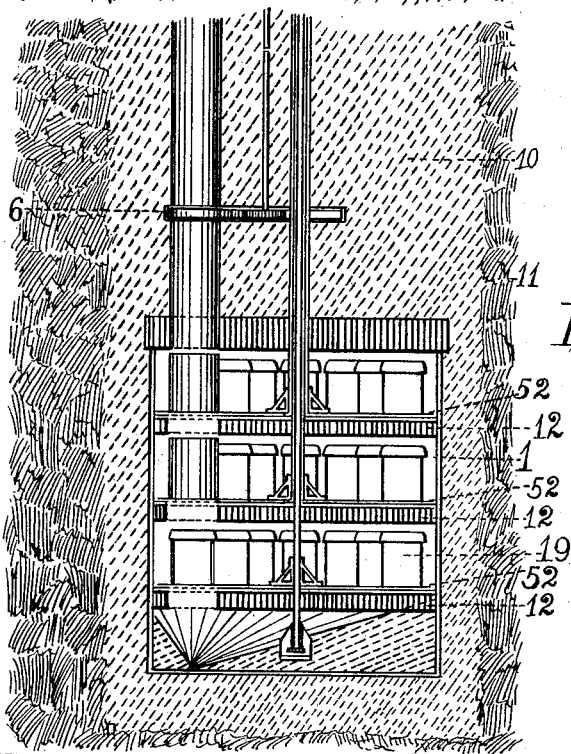
WITNESSES:
H. Clay Bowsher
Henry F. Miller
INVENTOR.
David K. Thomas D. K. THOMAS.
SAFE AND VAULT.
APPLICATION FILED FEB. 17, 1912.
1,062,056.
Patented May 20, 1913.
7 SHEETS—SHEET 2.
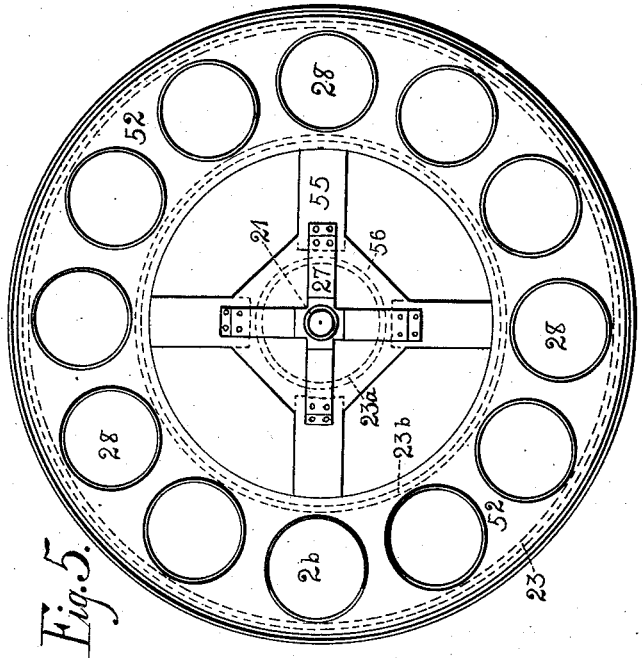
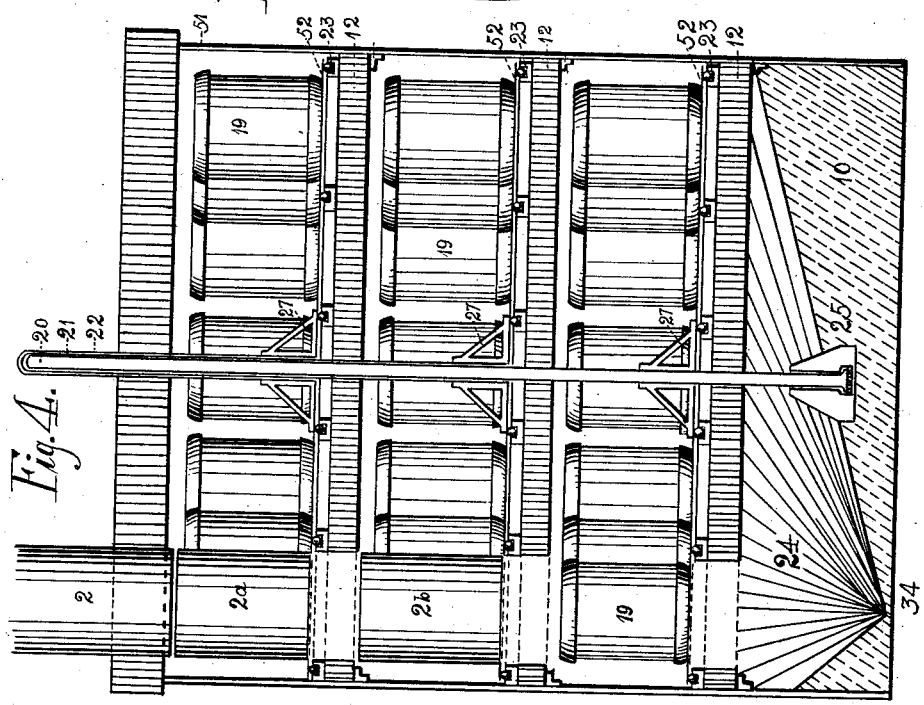

D. K. THOMAS.
SAFE AND VAULT.
APPLICATION FILED FEB. 17, 1912.
1,062,056.
Patented May 20, 1913.
7 SHEETS—SHEET 3.
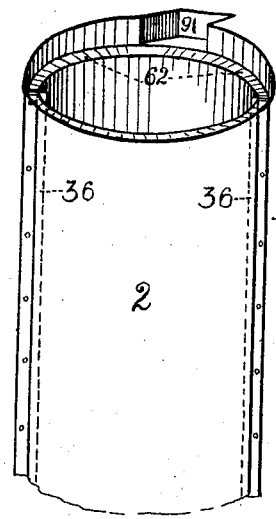
Fig. 6.
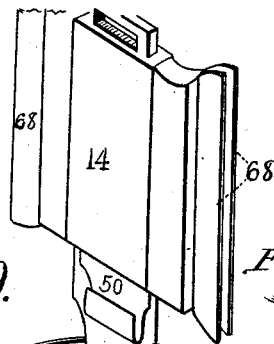
Fig. 9.
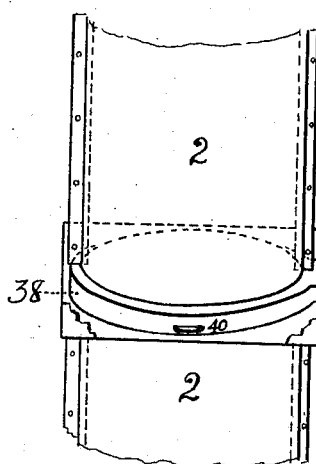
Fig. 7.
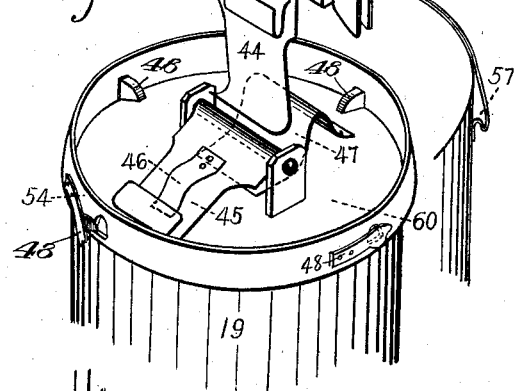
Fig. 19.
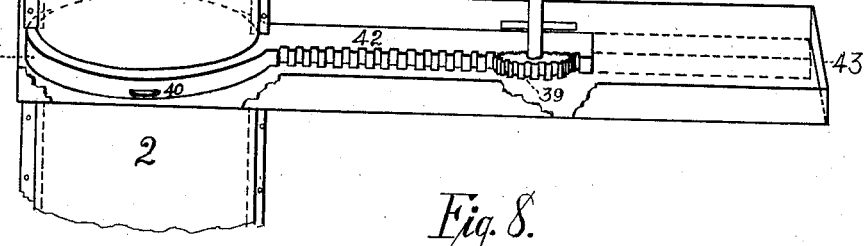
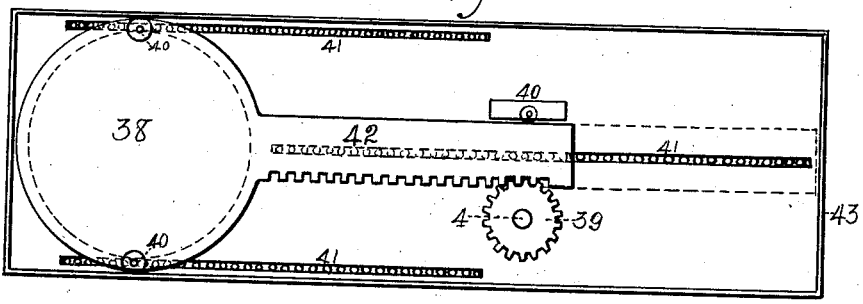
Fig. 8.
WITNESSES:
H. Clay Bowsher
Henry R. Miller
INVENTOR.
David K. Thomas D. K. THOMAS.
SAFE AND VAULT.
APPLICATION FILED FEB. 17, 1912.
1,062,056.
Patented May 20, 1913.
7 SHEETS—SHEET 4.
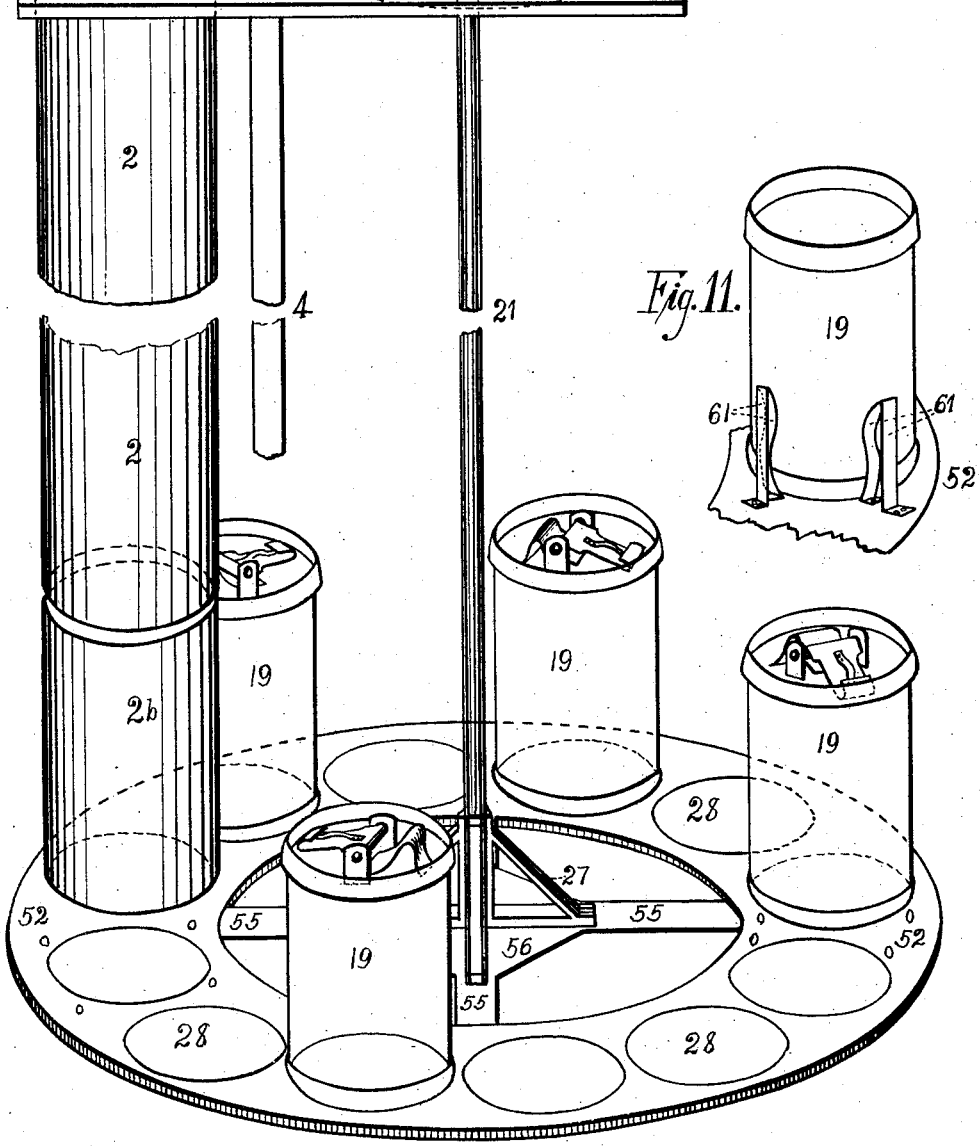

D. K. THOMAS.
SAFE AND VAULT.
APPLICATION FILED FEB. 17, 1912.
1,062,056.
Patented May 20, 1913.
7 SHEETS—SHEET 5.
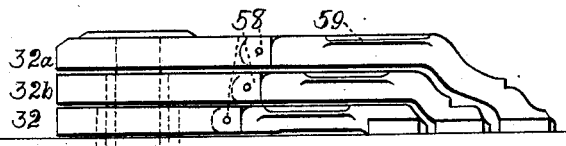
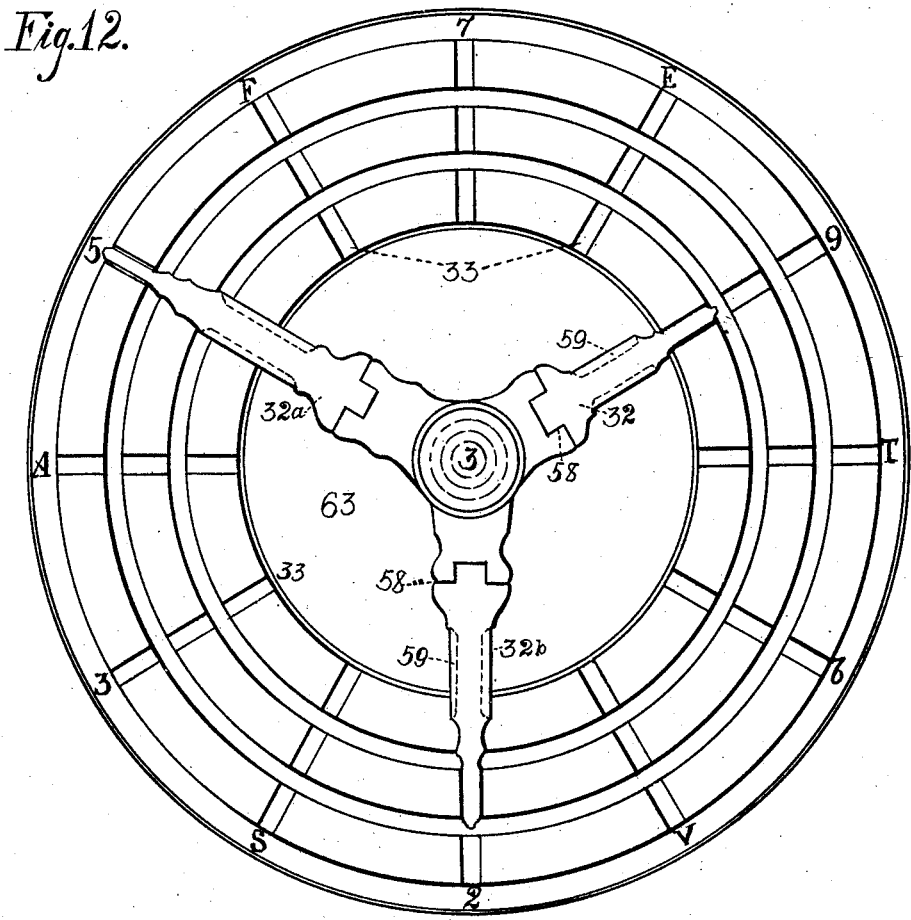
WITNESSES:
INVENTOR.

D. K. THOMAS.
SAFE AND VAULT.
APPLICATION FILED FEB. 17, 1912.
1,062,056.
Patented May 20, 1913.
7 SHEETS—SHEET 6.
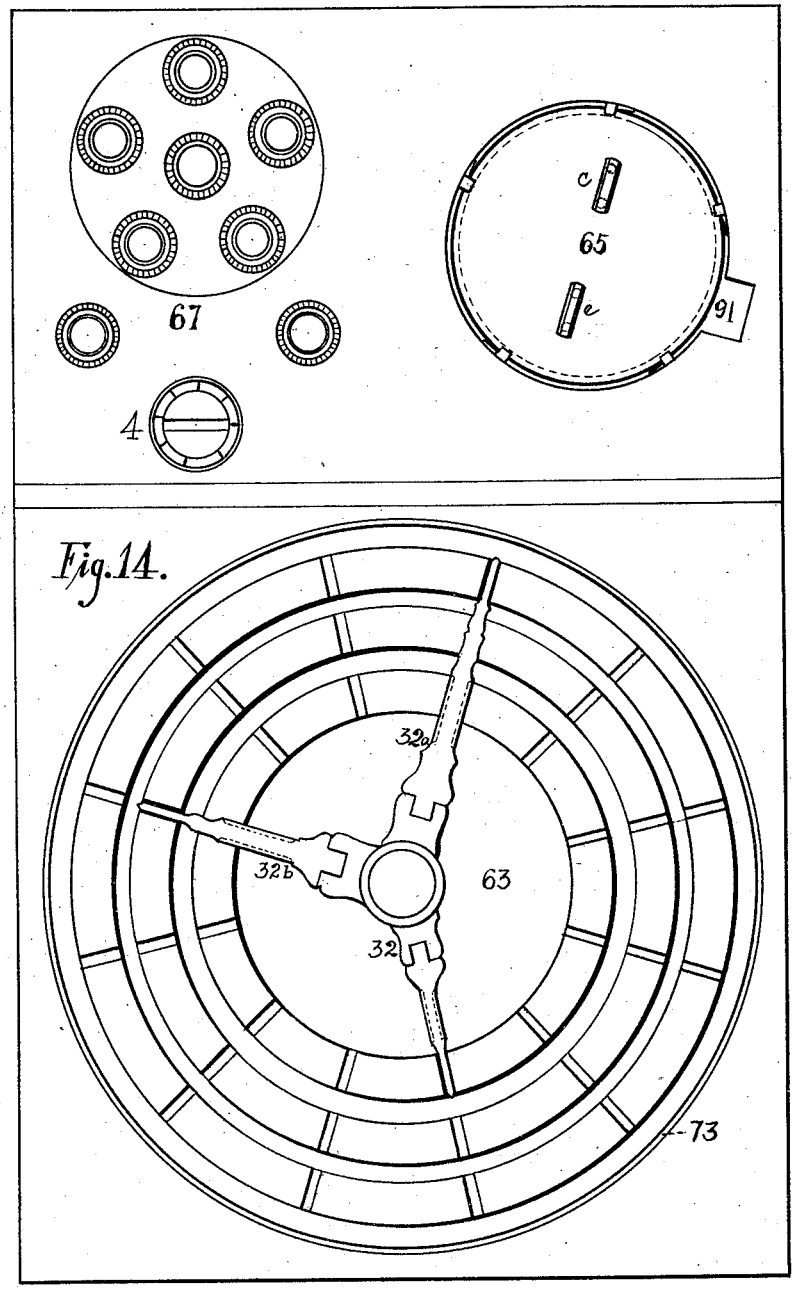
Fig. 20.
Fig. 14.
WITNESSES:
INVENTOR.
David K. Thomas D. K. THOMAS.
SAFE AND VAULT.
APPLICATION FILED FEB. 17, 1912.
1,062,056.
Patented May 20, 1913.
7 SHEETS—SHEET 7.
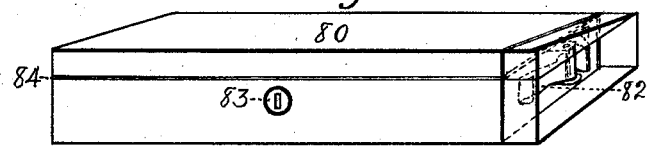
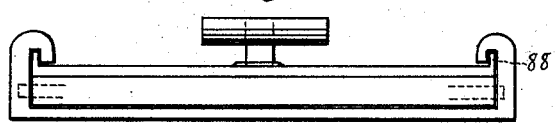
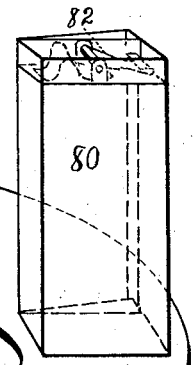
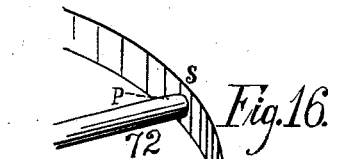
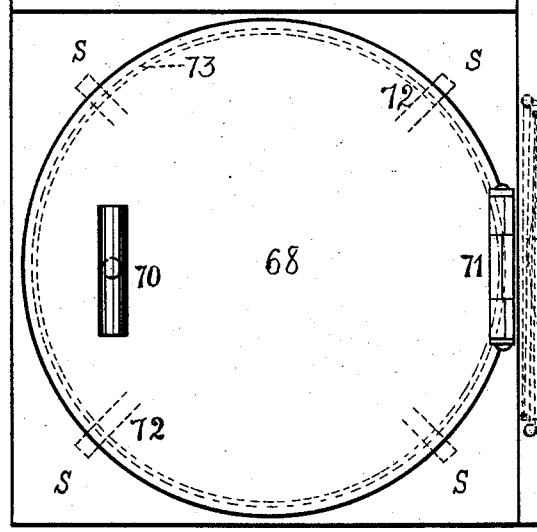
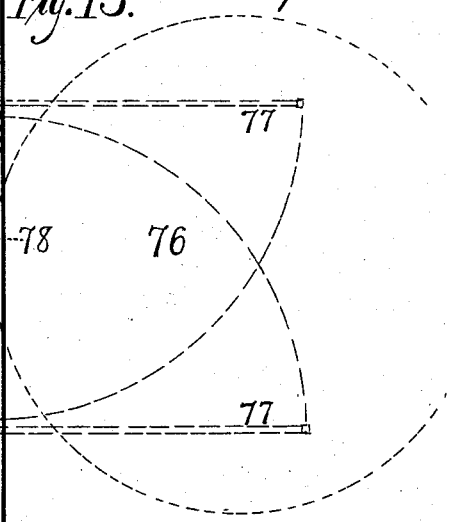
WITNESSES:
INVENTOR.
David K. Thomas

UNITED STATES PATENT OFFICE.

DAVID K. THOMAS, OF KANSAS CITY, MISSOURI.

SAFE AND VAULT.

1,062,056.

Specification of Letters Patent.

Patented May 20, 1913.

Application filed February 17, 1912. Serial No. 678,366.

*To all whom it may concern:*

Be it known that I, DAVID KELLER THOMAS, a citizen of the United States, residing at Kansas City, in the county of Jackson and State of Missouri, have invented a new and useful Safe and Vault, of which the following is a specification.

My invention relates to improvements in safes and vaults, and the object of it is to attain security against safe-blowers and thieves, and against damage by fire and water; and at the same time, by simple, easy and quick manipulation, to serve the practical purposes of the ordinary safe or vault in banks, stores, post offices, express offices, depots, stations, homes, or wherever secure depositories are needed. I attain these objects by means of the mechanism illustrated in the accompanying drawings, in which—

Figure 1 is a vertical section of the depository with its subterranean chamber, shaft and revolving rods set into an excavation and adapted to be incased in cement, reinforced as desired; Fig. 2 illustrates the means of lowering a container through the shaft; Fig. 3, the means provided for grasping a container to raise it from the subterranean chamber; Fig. 4, a sectional view of the chamber on an enlarged scale; Fig. 5, a horizontal projection of the middle compartment or balcony of the chamber; Fig. 6, a view of the shaft on an enlarged scale; Fig. 7, a perspective view of the cut-off shown at 6 Fig. 1; Fig. 8, a horizontal view of cut-off; Fig. 9 is an isometric illustration of the carrier; Fig. 10 simply illustrates the manner of revolving a compartment shelf to bring any container on it centrally under the shaft; Fig. 11 shows the guards for retaining the containers in position on the shelves; Fig. 12, the disk on the top face of the depository; Fig. 13, an elevation of same; Fig. 14, a view of the top face; Fig. 15, the metallic lid covering the disk; Fig. 16, one of its slighty curved bolts; Fig. 17, a safety deposit box; Fig. 18, a perspective view of same; Fig. 19 (Sheet 3) illustrates the form of rim-band around top of containers; Fig. 20, an elevation of the top face of the depository; Fig. 21, an elevation of the rectangular lid at top of depository.

Like numbers indicate like parts throughout the drawing.

The subterranean chamber, 1, Fig. 1, the vertical shaft, 2, the cut-off, 6, with its working rod, 4, the revolving rods, 3, and the top face, Fig. 14, constitute the structural parts of the depository. The subterranean chamber, 1, Fig. 1, (shown on enlarged scale, Fig. 4) is made of steel, cylindrical in form and enameled or coated on both its inner and outer surfaces to render it more durable and absolutely impervious to moisture. It may be installed at any desired depth, depending upon conditions, to insure safety. As indicated in Fig. 1, 9 represents a basement floor; 8, a basement wall; 5, the floor above; 10, cement or concrete incasement; 11 earth. This subterranean chamber contains one or more circular compartments (in this case three), arranged in vertical order and varying in height as desired from one to several feet. Each compartment is provided with a circular metallic shelf, 52, extending close to its wall, adapted to support receptacles or containers, 19, Fig. 4, for money, papers and valuables, and is adjusted to revolve horizontally on ball bearings, 23; see also 23, 23ª, 23ᵇ, Fig. 5. All tracks for these ball bearings are firmly riveted to the steel joists, 12. This chamber is provided also with an irregular funnel shaped bottom, 24, sloping downward to 34, which point is centrally under shaft 2; thus any article accidentally dropping into the chamber must come to rest at this point from which it may readily be recovered.

The cylindrical shaft, 2, extends from the top face of the depository into the subterranean chamber and is made moisture proof throughout. It is the only avenue of communication with the chamber and is not intended if cylindrical to exceed ten or twelve inches in diameter. It is provided at the top with a recess, 91, Fig. 6, adapted to receive the motor apparatus used in lowering and raising containers to and from their positions in the chamber. Just below this recess is an offset or bench, 62, supplied with a rubber cushion upon which the shaft-cover, 65, Fig. 14, may be securely clasped rendering the shaft water proof. The shaft is further provided with two flanges or guide strips, 36, disposed on its inner surface at diametrically opposite positions and set in exact line with the rod or rods revolving the compartment shelves as shown on top plate Fig. 10.

Communication with the subterranean chamber through the shaft may be effectually intercepted by means of one or more cut-offs, 6, Fig. 1, shown in enlarged perspective, Fig. 7. The cut-off plate, 38, which is steel of any desired thickness, has an extended arm rack, 42, which engages pinion, 39, all inclosed in box, 43, and placed just above the chamber in such manner that plate, 38, sits at right angles to the shaft and intercepts its sections whose adjacent ends are secured to the upper and lower sides of said box in waterproof joints. Rod 4 is provided at its top to receive a lever or crank and extends from the top face to pinion 39 to which it is permanently fastened. The cut-off plate 38 moves on ball bearings, 41, Fig. 8, in close proximity to the ends of the sections of the shaft and is guided by the small guide wheels, 40. By turning rod 4 the operator opens and closes communication with the subterranean chamber. (The most complete and important combination locks of the depository are those locking the cut-off rod, and rendering the cut-off plate, 38, immovable; these locks are not illustrated in this application and are mentioned here only to indicate that the fullest security has not been neglected.)

The circular shelves in the compartments of the subterranean chamber are revolved horizontally by means of the rods, 20, 21, 22, Fig. 4, one working within another and all sheathed in a protecting tube. These rods extend from an indicating disk, 63, Figs. 12 and 14, secured on the top face, each to its respective shelf in the chamber where it is rigidly attached to the central plate, 56, and further secured by the braces, 27, Figs. 4 and 5, which are firmly riveted to the arms 55 of the shelf and to the central plate. This central plate is supported on the ball bearing represented by the dotted line 23$^a$. The rod working the lowest shelf works within the others and extends to the bottom of the chamber where it rests pivotally on ball bearing in box 25, Fig. 4. Each of the other rods ends at its respective shelf and is retained centrally by the rod within it and also by passing through a small plate riveted to the stationary joist, 12, above its shelf. The upper ends of the rods rise just above the face of the indicating disk which is secured on the top face centrally above the chamber, and are there firmly fitted with arms or pointers, 32$^b$, Fig. 10; see also 32, 32$^a$, 32$^b$, Fig. 12, which serve also as cranks. These pointers or cranks are flexed by means of a joint hinge, 58, to raise them from or sink them into the grooves, 33, Fig. 12, of the disk into which their ends snugly fit. These grooves are arranged concentrically on the disk and correspond exactly in number and position to the number and position of the containers on the compartment shelves and are accordingly indicated by symbols, Fig. 12. The finger grooves 59, Fig. 13, facilitate handling the arms or cranks. By raising the arm or crank of the rod of any shelf from the groove and moving it around to right or left over the face of the disk the operator may bring any container in the subterranean chamber centrally under the shaft where it may readily be grasped by the carrier 14, Fig. 2, and raised to the surface.

2$^a$ and 2$^b$, Fig. 4, are extensions of the shaft, 2, and are firmly riveted to and revolve with their respective shelves. They are represented here in position to make and their only function is to afford, when turned to this position, a practically continuous shaft to the lowest compartment of the chamber.

The containers shown at 19, Figs. 2 and 4, are metallic cylindrical vessels, but may be of various forms suited to receive money, papers or articles of value, of a size to pass through the shaft and of height adapted to that of the compartments to which they belong. Each container is provided with a metallic cover closely fitted into its top where it is securely held by spring stops, 48, which may be pushed outward when the cover is to be removed.

Each cover is provided with a long clasp, 45, Fig. 9, loosely axled nearly an inch above its surface, and just back of the clasp axle is a spring, 47, set parallel with the axle and of the same breadth and height, its free end extending under the axle of the clasp. The containers are also supplied at the top with an outer rim-band, 57, Fig. 19, which is inclined outward at its lower edge to form a hold for grappling hooks in case of accident to the clasps. These containers all have their individual places on the compartment shelves depending on their contents and corresponding to the symbols on the indicating disk, and in their descent they are determined to exact position and retained there by the guards, 61, Fig. 11. Four of these guards are firmly riveted to the shelf for each container. Their positions are indicated also by o, o, etc., Fig. 10.

The carrier, 14, Fig. 9, is provided with grooves 68 in its lateral wings adapted to work closely over the flanges, 36, Fig. 6, of the shaft, and to guide it centrally while carrying containers to and from the subterranean chamber. It is also provided at its upper end with an eye to receive the steel tape, 13, Fig. 2, or in lieu of the steel tape a strong cord may be used and at its lower end with a short clasp, 50, Fig. 9, and a long one, 44, both clasps are of spring steel and firmly fastened to the body of the carrier.

To lower a container into the chamber clasp 45 is raised and hooked to clasp 50 of the carrier. When the container reaches its compartment shelf, and the supporting cord or steel tape is relaxed the weight of the carrier automatically unhooks these clasps while spring 46, throws clasp 45 out and away from clasp 50, and being loosely axled it falls to the position shown in the drawing. The container is now left secured by guards in its proper position on the shelf, the ends of the axle of its clasp being left in line with the center of its shelf.

When any desired container is to be raised from the chamber it is moved to the position centrally under the shaft as before described and the pointer or crank sunken into the corresponding groove on the disk. The carrier is now lowered and by means of the guide strips of the shaft it reaches the container in the same position each occupied when the container was deposited—the long clasp of the carrier being just above the axle and spring 47. When the carrier touches the axle and spring it is of necessity and by its own weight automatically guided between the two and its hook passes under the axle, securely grasping it to raise the container. By this device no readjustment of the carrier is necessary to clasp or un-clasp the containers and carrier. The containers may be of various forms and sizes as before mentioned.

Figs. 17 and 18 represent the form used as safety deposit boxes, each provided with its clasp, axle and spring as indicated at 82. 83 represents the keyhole and 84 the line upon which the lid, 80, opens.

The top face of the depository is covered by the circular lid, 68, Fig. 15, and the sliding plate, 69. 71 represents the hinge upon which the circular lid turns back to position 76 where it is supported by legs, 77. These legs may be returned to position 78 when not in use. When this lid is closed it rests upon a circular cushion whose position is indicated by the dotted line 73, and is pressed firmly upon it by means of a slight bend in the bolts securing and slightly depressing the lid when plunged into their sockets in the plate S, making it a waterproof protection to the indicating disk.

P, Fig. 16, indicates the slight curve in the bolts.
The rectangular cover-plate, 69, forms a second cover for the shaft and also covers the top of the cut-off rod 4, Fig. 14 and the exposed knobs 67 of the cut-off locks. It is supplied with a combination lock and also a time lock not indicated in the drawing, and is adjusted to move off horizontally on ball bearings guided by the grooved flanges 74 and 88, Fig. 21, when the depository is to be opened.
What I claim as new and desire to secure by Letters Patent is:

1. A fire and burglar proof depository composed of steel and reinforced concrete comprising a subterranean, cylindrical metallic chamber of one or more compartments arranged in vertical order and each provided with a circular shelf extending close to and around the wall in the compartment and adapted to support containers or receptacles for valuables and adjusted to revolve horizontally; a top face upon which is fastened an indicating disk and in which is an opening into a tube or shaft, and also an opening for the grooved top of a cut-off rod; a rod for each of said shelves, one working within another, and extending from said disk, each to its respective shelf, to which it is rigidly fastened in the subterranean chamber, and provided at the top with an arm or crank adapted to revolve it; a metallic tube or shaft extending from the upper face to the compartments in the said chamber of suitable caliber to permit the passage through it of the containers or receptacles; a cut-off moved by means of said cut-off rod mentioned above to open and close communication through the shaft; containers or receptacles suitable for receiving valuables, each having a lid secured within its top which lid is provided with a clasp loosely axled on its top; a flexible connection; a carrier adapted to move through said shaft and provided with an eye to receive said flexible connection, and also provided with two firmly attached clasps adapted to hold said containers while they are lowered to and raised from their places on said shelves, substantially as shown.

2. A fire and burglar proof depository comprising a subterranean cylindrical chamber of one or more compartments arranged in vertical order; a circular shelf extending close to and around the wall in each compartment, adjusted to revolve on ball bearings and adapted to support containers of valuables and to hold them in exact position by means of guards; a tube or shaft communicating from a top face with said compartments; containers for valuables; a top face with an opening through it into the tube or shaft, and provided with an indicating circular disk firmly fastened to it and disposed vertically above said chamber, center with center, said disk having grooves diametrically set and concentrically arranged; a rod for each shelf respectively, extending from the upper surface of said disk at its center to the center of its respective shelf to which it is rigidly attached; an arm or crank for each rod firmly attached to it at the upper surface of said disk and provided with a hinge joint by which it may be flexed and sunken into or released from the grooves of said disk and adapted to move around horizontally over the face of said disk, thus revolving the shelf so as to bring any container upon it centrally under said shaft, substantially as indicated.

3. A fire and burglar proof depository comprising a subterranean cylindrical chamber of one or more compartments arranged in vertical order, each having a revolving shelf and a central rod extending to the top face; a top face with an indicating disk upon it, an opening through it into a tube or shaft suitable for the passage through it of receptacles for valuables and extending from the upper face to the compartments of said chamber and consisting of two sections between which may be interposed a metallic plate or cut-off; a cut-off set horizontally across the opening of said shaft at any desired distance above said chamber, and consisting of a box, a movable metallic plate with a laterally extending rack, a pinion adapted to engage this rack, and a rod extending from the pinion in which it is firmly set to the top face, where it has a deeply grooved end to receive a bar adapted to turn it and thus move the metallic plate substantially as shown.

4. A fire and burglar proof depository comprising a subterranean cylindrical chamber of one or more compartments arranged in vertical order, each provided with a horizontally revolving shelf extending close to and around the wall in its compartment and adapted to receive containers for valuables and, by means of guards, on said shelves, to hold such containers in exact position; a top face having an indicating disk secured upon it centrally over said chamber, an opening through it into a shaft or tube, and also an opening for the top of a cut-off rod; a metallic cut-off plate horizontally disposed across said shaft and adjusted to be moved to and from position by means of said rod; a rod extending from each of said shelves to the center of which it is rigidly fastened, to the indicating disk and adapted to revolve one within the other; an arm or crank fitted to the top of each rod at the face of the disk; a metallic tube or shaft suitable for the passage through it of containers for valuables and extending from the top face to said compartments, and provided with two flanges or guide-strips disposed diametrically opposite each other on the inner surface of the shaft and in line with the center of the disk; a flexible connection; a carrier having grooves on opposite sides adapted to receive the guide-strips in the shaft, and having an eye in which to fasten said flexible connection; and provided at the other end with two firmly fixed clasps, one longer and with more open hook than the other; metallic containers adapted to receive valuables and to pass through said flanged shaft, each provided with a lid and the means of securing it in the top, and also provided with an outer band around the top projecting outward at its lower edge, each of said lids having a clasp on its top to engage with the shorter clasp of the carrier and also having a spring so set and adjusted as to guide the long clasp of the carrier under the axle of the lid-clasp when the carrier is lowered upon said lid substantially as described.

5. A fire and burglar proof depository comprising a subterranean chamber of one or more compartments; a hollow, metallic shaft; a cut-off for said shaft and means to move it; an upper face upon which is a circular indicating disk and a cushion surrounding it, an opening into said hollow shaft and a cushion surrounding it, and an opening for the knobs of locks; a heavy circular metallic cap or cover hinged at one point so as to cover said disk when let down and to rest upon said cushion, this cover being provided with bolts to secure it firmly in place and by a slight curve to depress the cover upon said cushion when the bolts are plunged into their sockets; a circular metallic cover for an opening in the top face into a tube or shaft; a heavy metallic rectangular cover extending over the opening in the top face into said shaft, the top of a cut-off rod and over the knobs of said locks, provided with securing bolts, and adapted to slide horizontally in grooved bearings substantially as shown.

DAVID K. THOMAS.

Witnesses:
 KATE HOFFMAN,
 B. H. HOUSE.

Copies of this patent may be obtained for five cents each, by addressing the "Commissioner of Patents, Washington, D. C."